United States Patent [19]

Parrett et al.

[11] Patent Number: 4,860,539

[45] Date of Patent: Aug. 29, 1989

[54] VEHICLE STABILIZER APPARATUS AND STABILIZER ACTUATOR COMPONENT THEREOF

[75] Inventors: John T. Parrett, St. Joseph; James P. Fairbairn, Benton Harbor; Walter Jaworski, St. Joseph, all of Mich.

[73] Assignee: Terex Corporation, Benton Harbor, Mich.

[21] Appl. No.: 204,220

[22] Filed: Jun. 9, 1988

[51] Int. Cl.[4] .................................................. F16D 31/02

[52] U.S. Cl. ........................................ 60/426; 60/427; 60/468; 60/494; 212/153; 212/189; 280/766.1

[58] Field of Search ............................... 212/189, 153; 280/766.1, 764.1; 60/426, 427, 468, 484, 494; 91/534, 508

[56] References Cited

U.S. PATENT DOCUMENTS

| | | | |
|---|---|---|---|
| 3,362,548 | 1/1968 | Cunningham | 212/189 X |
| 3,630,120 | 12/1971 | Carlson | 91/534 X |
| 3,856,152 | 12/1974 | Parrett et al. | 212/145 |
| 4,264,014 | 4/1981 | Hogg et al. | 212/153 |
| 4,632,261 | 12/1986 | Cuhel | 212/189 X |

OTHER PUBLICATIONS

Brochure No. C-1-83 of Benton Harbor Engineering, Benton Harbor, Mich. which was published more than a year prior to Jun. 9, 1988, the filing date of this application.

*Primary Examiner*—Edward K. Look
*Attorney, Agent, or Firm*—Wood, Dalton, Phillips Mason & Rowe

[57] ABSTRACT

A vehicle stabilizer apparatus having a plurality of hydraulic stabilizer actuators with each actuator having an integral isolation valve effective to enable operation of a sequentially operable device such as a boom cylinder only after ground-engaging feet associated with the actuators have been brought into firm contact with the ground or other supporting surface. Each actuator is mounted for bodily movement between upper and lower positions on an associated vehicle supported mounting pin. The actuator is caused to move to its upper position when the associated ground-engaging foot engages the ground and through a plunger and plunger spring associated with the isolation valve the position of the actuator is sensed. The isolation valve is in a hydraulic circuit to prevent operation of the boom cylinder unless the actuator is in its upper position.

14 Claims, 5 Drawing Sheets

VEHICLE STABILIZER APPARATUS AND STABILIZER ACTUATOR COMPONENT THEREOF

Field of the Invention

This invention pertains to vehicle stabilizer apparatus and a hydraulic stabilizer actuator component thereof used for stabilizing a vehicle having a lifting crane or some type of boom-supported elevated work platform or basket mounted on the vehicle chassis. The vehicle stabilizer apparatus assures that a plurality of ground-engaging feet are firmly engaged with the ground before the lifting crane or other elevated structure can be operated. Additionally, the vehicle stabilizer apparatus enables continued operation of the lifting crane or other elevated device in the event that one ground-engaging foot is lifted off the ground as a result of vehicle tilt during operation.

BACKGROUND OF THE INVENTION

Vehicles having lifting cranes or elevated work platforms or baskets mounted on the vehicle chassis commonly have one or more stabilizer actuators mounted on opposite sides of the vehicle, with each stabilizer actuator having a ground-engaging foot to prevent the vehicle chassis from capsizing during operation of the crane or other elevated work station. It is important that the part of the hydraulic circuit used to operate the crane or work station be isolated to assure that the work station cannot be elevated relative to the vehicle chassis unless the stabilizer actuators are in operative position and functioning to prevent tipping or capsizing of the vehicle chassis.

Known methods to accomplish the aforesaid isolation have either been a combination of electrical limit switches and solenoid-operated hydraulic valves or cam-operated hydraulic valves. In both of these methods, the sensing of the proper positioning of the stabilizer actuator is triggered by motion of a piston rod of the stabilizer actuator past a fixed position on the vehicle chassis. As a result, when the vehicle is on uneven or nonlevel ground, or when one side of the vehicle is adjacent to a paving curb or similar elevation, the operation of a limit switch or a cam-operated valve may be prevented because the ground-engaging foot may contact the ground before passing the fixed-position trigger point. Conversely, if there is a hole in the ground at the location where a ground-engaging foot attempts to make contact with the ground, there can be operation of a limit switch or cam-operated valve, even though the ground-engaging foot has not been placed in firm engagement with the ground.

SUMMARY OF THE INVENTION

A primary feature of the invention is to provide a hydraulic actuator usable as a stabilizer actuator and which has an integral isolation valve effective to isolate, and thus render inoperable, a hydraulic circuit for a lifting crane or other boom structure until, and unless, the stabilizing actuators are in contact with the ground on both sides of the vehicle.

Another feature of the invention is to provide a stabilizer-type actuator having the integral isolation valve wherein the isolation valve is operable solely as a result of a ground-engaging foot of the stabilizer actuator coming into firm contact with the ground and without reference to any particular position or elevation of the vehicle chassis.

An additional feature of the invention is to provide a stabilizer-type actuator, as defined in the preceding paragraphs, wherein, after the stabilizer actuator feet have come into firm contact with the ground, the hydraulic circuit for the boom or other vehicle-mounted structure can continue in operation even though one stabilizer actuator foot is temporarily lifted off the ground.

An object of the invention is to provide a new and improved vehicle stabilizer apparatus and a hydraulic stabilizer actuator usable as a component thereof.

Still another object of the invention is to provide a hydraulic stabilizer actuator for pressing an element against a support surface and usable in a hydraulic circuit having a device only operable after the element engages the support surface, comprising: a cylinder having a piston and a piston rod extended therefrom for mounting said element; means for mounting said cylinder on a vehicle for movement along the axis of the piston rod between two positions whereby said cylinder has a first lower position when said element is out of engagement with the support surface and a second upper position when said element presses against the support surface; and an isolation valve carried by the cylinder and connectable into said hydraulic circuit and responsive to cylinder position to prevent operation of said device when said cylinder is in said first lower position.

A further object of the invention is to provide an actuator as defined in the preceding paragraph wherein said means for movably mounting said cylinder includes a transverse through slot in said cylinder with said slot being elongate along the axis of the piston rod movement, said slot being adapted for receiving a vehicle-carried mounting pin of a size less than the length of the slot to enable cylinder movement between said first and second positions.

Still another object of the invention is to provide an actuator as defined in the preceding paragraphs wherein said isolation valve has a poppet valve member urged to a closed position by a poppet spring and the cylinder movably mounts a plunger with a plunger spring disposed between the poppet valve member and the plunger, said plunger communicating with the actuator mounting slot for following contact with said mounting pin whereby the position of the plunger and the force of the plunger spring acting on the poppet valve member varies dependent upon the position of the cylinder, and the plunger spring always exerts a greater force on the poppet valve member in an opening direction than the force of the poppet spring normally acting to close the poppet valve member.

A further object of the invention is to provide a vehicle stabilizer apparatus having two or more of the hydraulic stabilizer actuators set forth in the preceding paragraphs and with the hydraulic stabilizer actuators having their isolation valves in a hydraulic circuit with a selector valve for cylinders for operating a boom of a lifting crane or other device, and the isolation valves are operable to connect said selector valve to an atmospheric pressure tank connection until the ground-engaging feet associated one with each of the hydraulic actuators come into firm contact with the ground and, thereafter, fluid under pressure can be delivered to the cylinders for the vehicle-mounted boom.

DESCRIPTION OF THE PREFERRED EMBODIMENT

Figure 1:
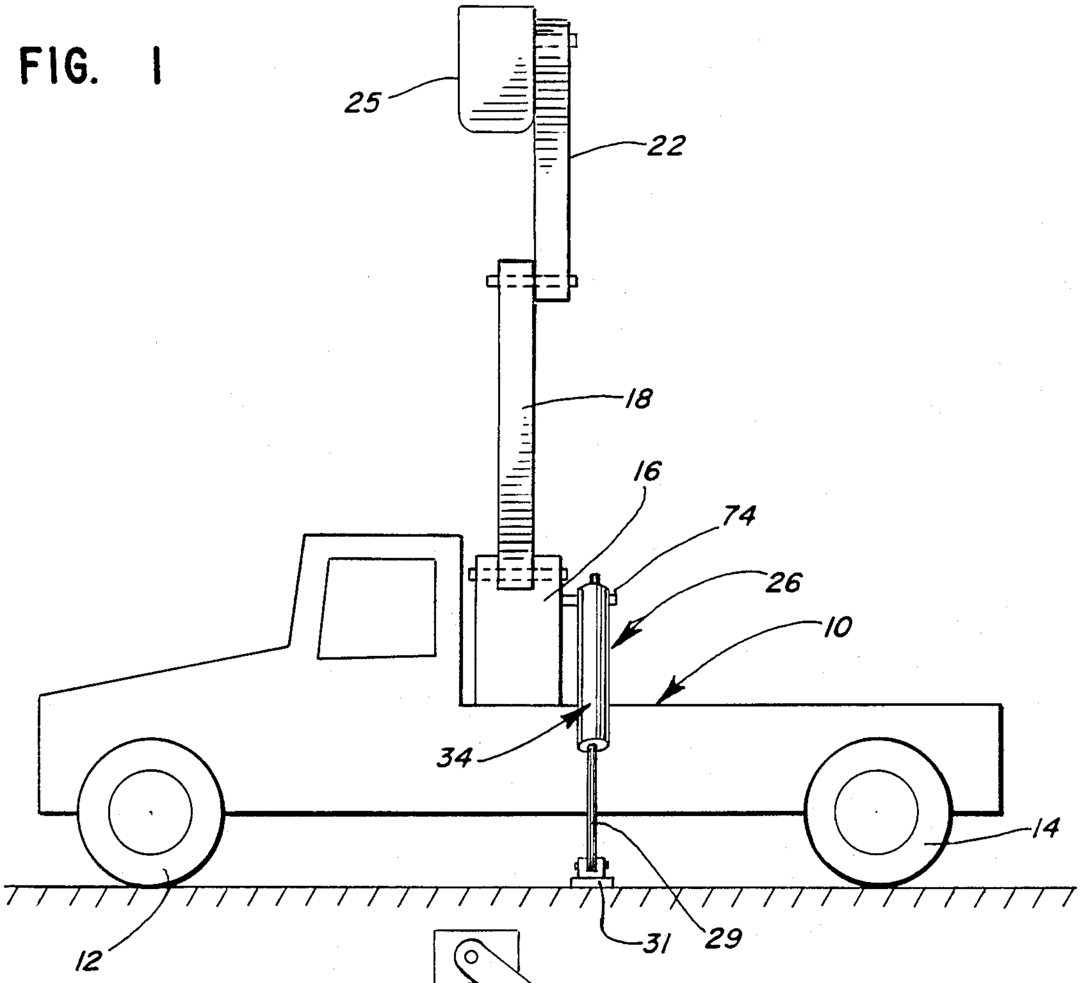
FIG. 1 is a side elevational view of a vehicle showing an elevated work basket supported by boom structure and having vehicle stabilizer apparatus associated therewith.
Figure 2:
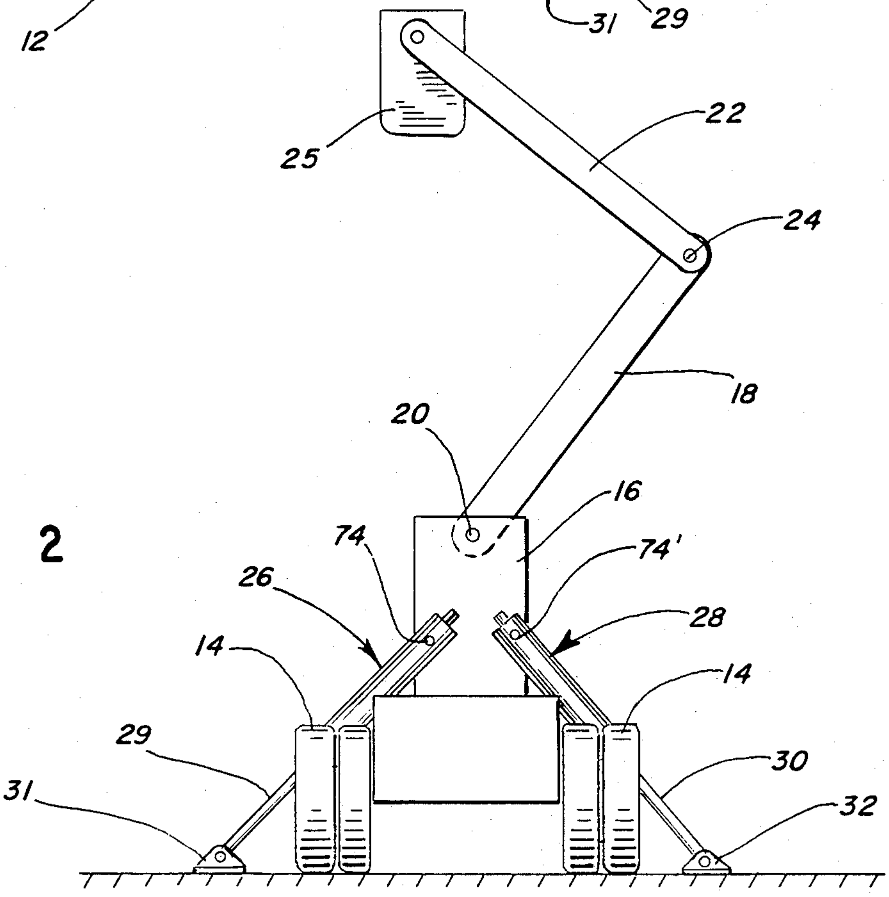
FIG. 2 is a fragmentary rear elevational view of the vehicle shown in FIG. 1 showing a pair of the stabilizer actuators located one at each side of the vehicle.

The general outline of a vehicle is shown in FIGS. 1 and 2. A vehicle chassis, indicated generally at 10, has front tires, one of which is shown at 12 and rear tires 14.

A chassis component 16 mounts a boom structure, shown diagrammatically, including a boom section 18 pivoted at 20 to the member 16 and a boom section 22 having a pivot connection 24 to the boom section 18. The boom can be the structure of a lifting crane or other elevated work platform or for a basket 25, as shown in the drawings. The boom structure is well known in the art and has boom cylinders associated with the boom sections for causing raising and lowering movement of the boom sections as well as rotation of the boom relative to the member 16.

The chassis-mounted member 16 mounts left and right-hand hydraulic stabilizer actuators, indicated generally at 26 and 28, and which have the respective piston rods 29 and 30 pivotally mounting at the lower end thereof a ground-engaging foot 31 and 32, respectively.

Figure 3:
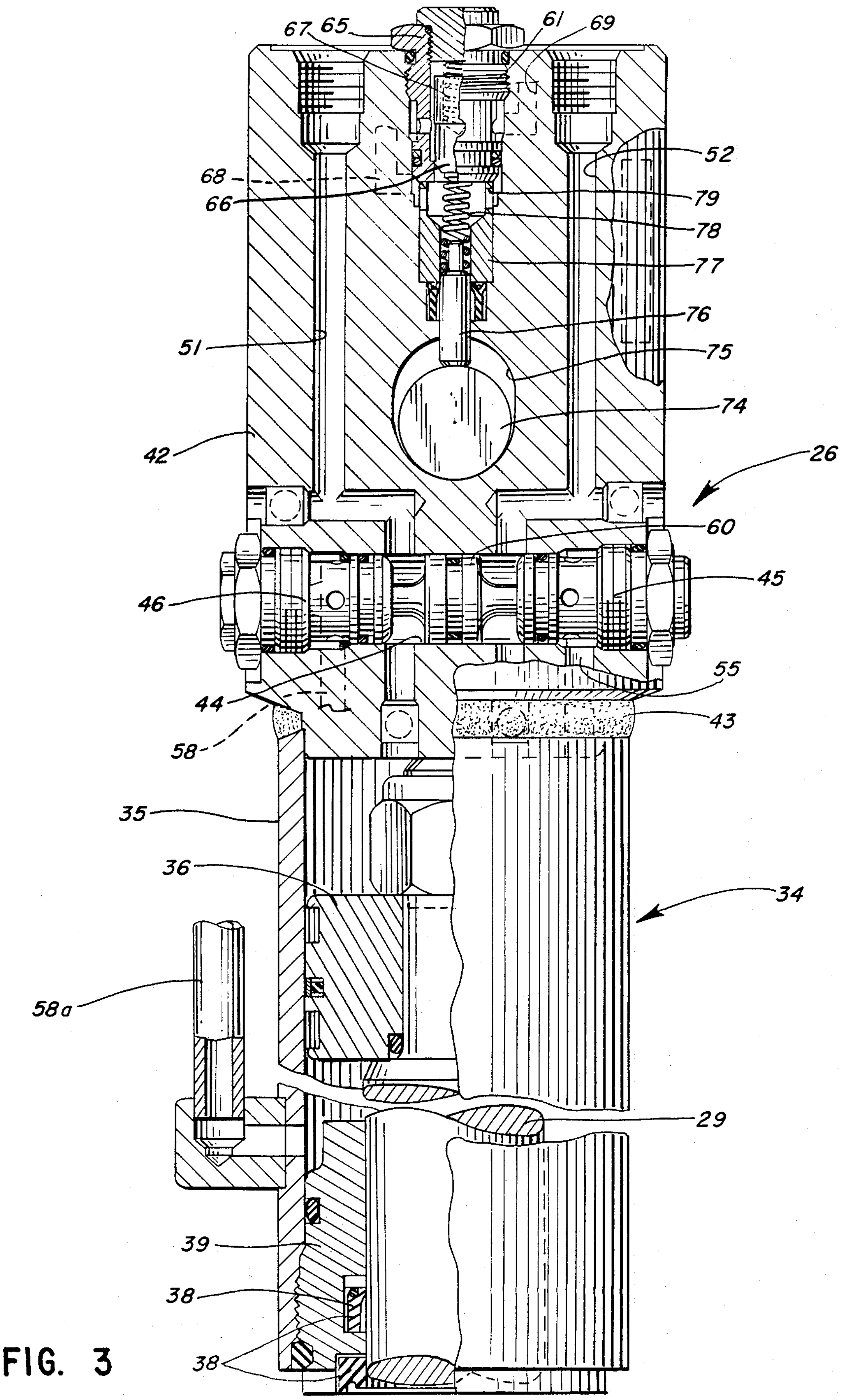
FIG. 3 is a fragmentary elevational view of the hydraulic stabilizer actuator with parts in section and broken away.

The hydraulic stabilizer actuator 26 is shown more particularly in FIG. 3. The hydraulic stabilizer actuator 28 is of the same construction.

The hydraulic stabilizer actuator 26 has a double-acting cylinder, indicated generally at 34, with a barrel 35 in which a piston 36 is reciprocal. The piston rod 29 is extendable from the lower end of the cylinder through piston rod seals 38 mounted in a head 39 fitted in an end of the cylinder barrel 35. The lower end of the piston rod 29 has an opening 40 (FIG. 4) providing a pivot mount for the ground-engaging foot 31.

A cap 42 for the actuator is welded by weld 43 to the upper end of the cylinder barrel 35 and has a series of fluid passages formed therein and mounts conventional position-holding check valves as well as an isolation valve and associated structure for achieving the new and improved results.

Figure 4:
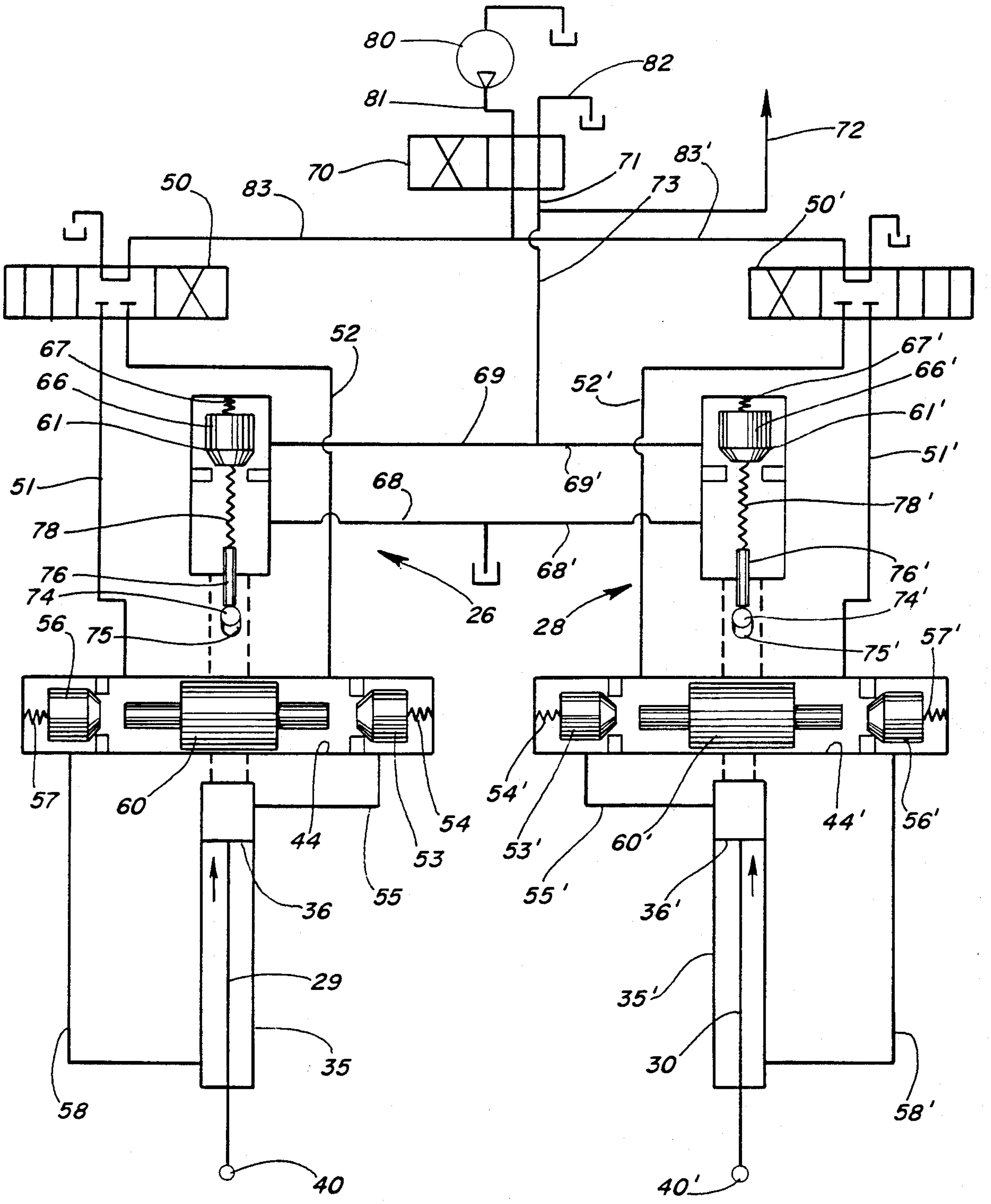
FIG. 4 is a hydraulic circuit drawing showing the hydraulic components thereof positioned for over-the-road travel of the vehicle.
Figure 5:
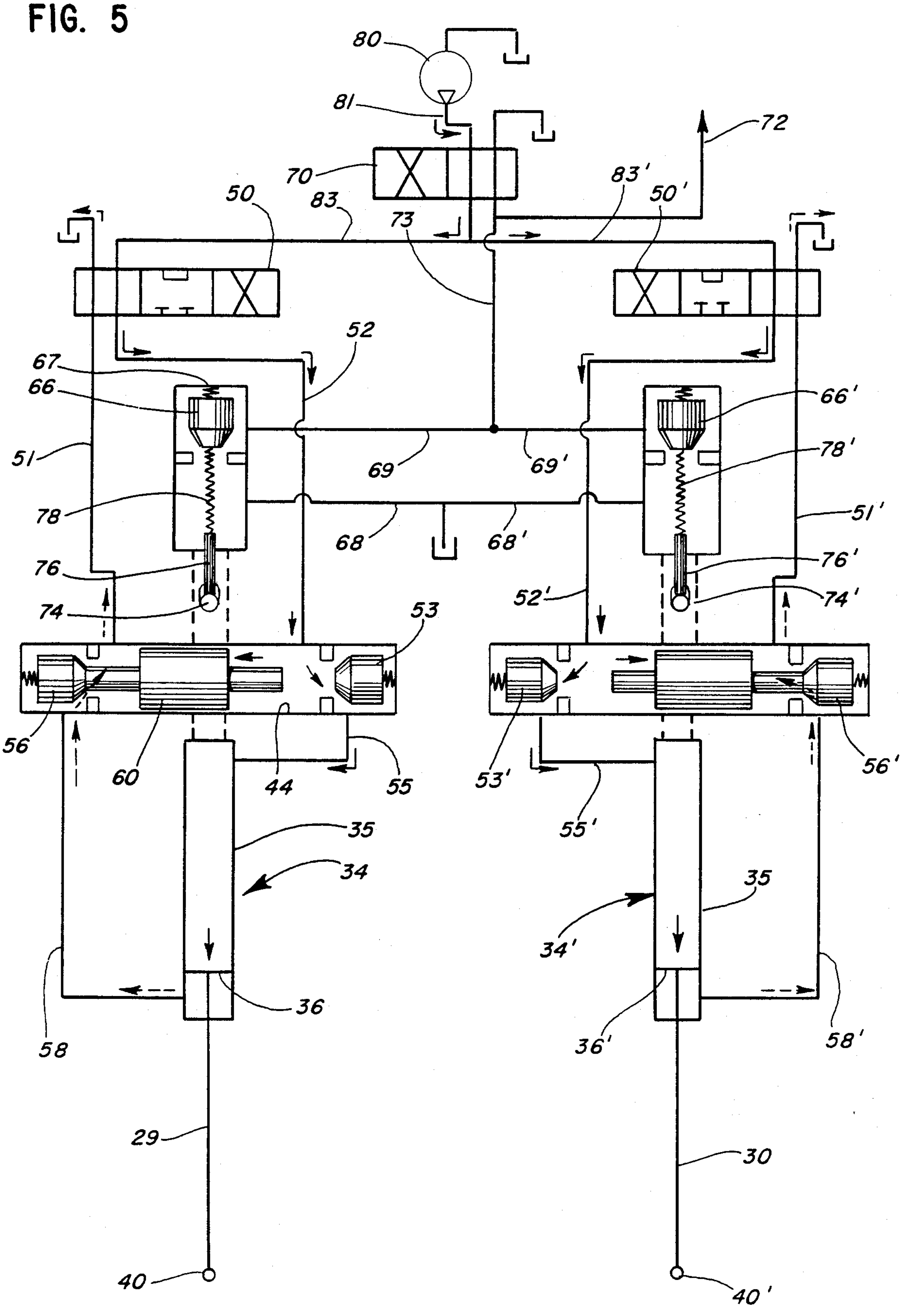
FIG. 5 is a drawing of the hydraulic circuit with the components in operative positions for lowering of the stabilizer actuators.
Figure 6:
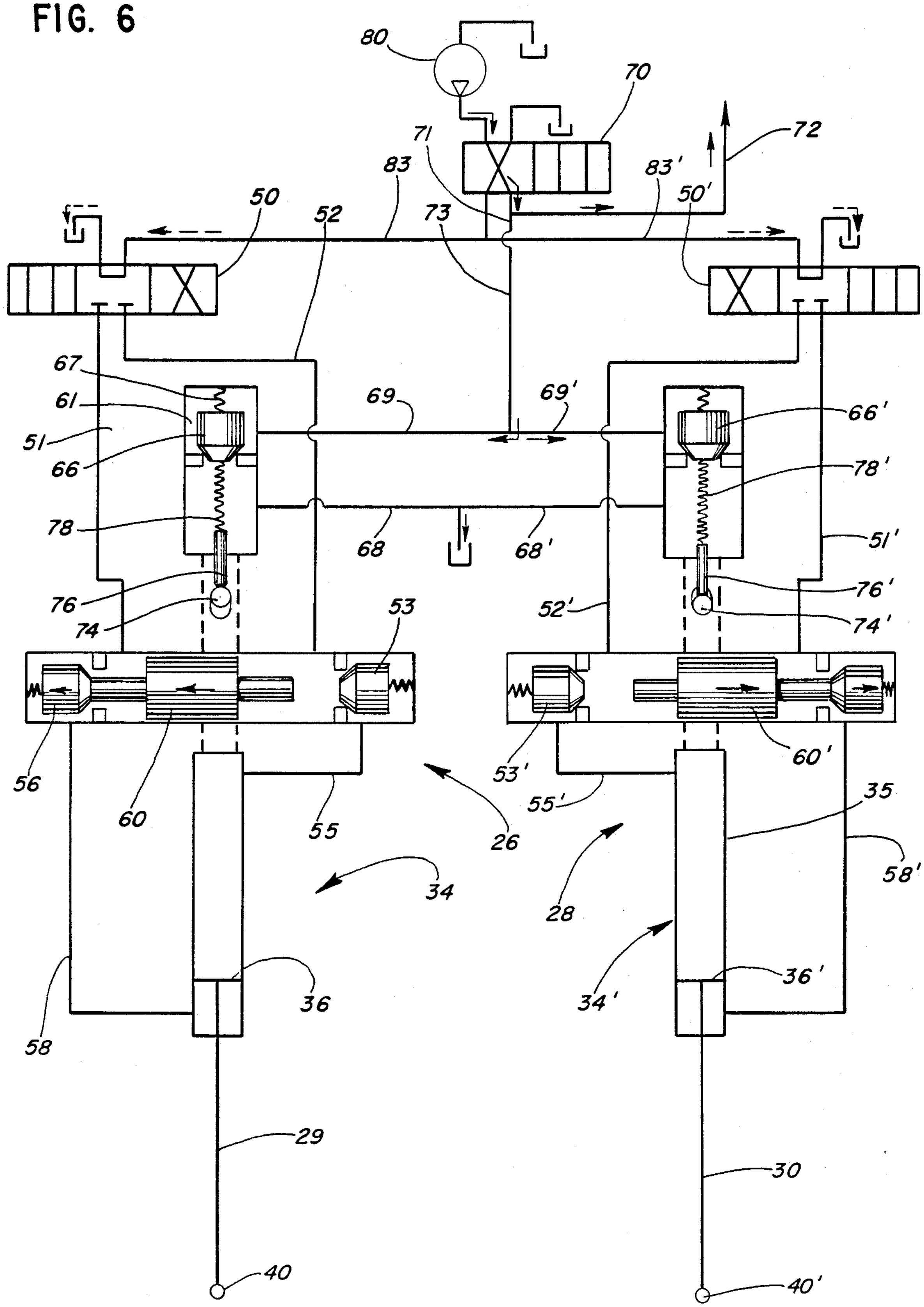
FIG. 6 is a drawing of the hydraulic circuit showing the components thereof positioned when the stabilizer actuators are extended and the vehicle has tilted toward the right to cause the left stabilizer actuator foot to leave the ground.

A transverse bore 44 in the cap 42 mounts a pair of type of cartridge-type check valves 45 and 46 each having a poppet valve member and which are shown diagrammatically in the circuit drawings of FIGS. 4 to 6 and which operate to control fluid connections to opposite sides of the piston 36 in the cylinder 34.

As seen in FIG. 4, the left-hand stabilizer actuator 26 has a left-hand control valve 50 for controlling fluid pressure and tank connections to a pair of fluid lines 51 and 52 including hoses and passages in the cap 42. The cartridge-type check valve 45 has a poppet valve member 53 urged closed against a seat by a spring 54 and which controls communication between line 52 and a line 55 defined by a passage in the cap extending to the upper end of the cylinder barrel 35. Fluid pressure in line 55 urges the piston 36 downwardly in the cylinder and forces the foot 31 into firm support with the ground.

The cartridge-type check valve 46 has a poppet valve member 56 urged to a closed position against a valve seat by a spring 57. This poppet valve member controls communication of the line 51 with a line 58 defined by an internal passage in the cap 42 and an external line **58*a* connected to the lower end of the cylinder beneath the piston 36. Pressure in line 51 causes elevating movement of the piston 36 and ground-engaging foot 31**.

A pilot check piston 60 is movable lengthwise of the bore 44 and is operable in a known manner in response to pressure conditions in lines 51 and 52 to physically contact and open one poppet valve member when fluid pressure is acting to open the other poppet valve member. The fluid pressure causes shift of the pilot check piston 60 to physically contact and open the nonpressurized poppet valve member.

The right-hand hydraulic stabilizer actuator 28 is of the same construction as the left-hand hydraulic stabilizer actuator 2 and, as shown in FIGS. 4 to 6, the components thereof are given the same reference numerals as those in connection with stabilizer actuator 26 with a prime associated therewith.

The actuator cap 42 mounts, at an upper end thereof, an isolation valve 61 in the form of a cartridge-type check valve having a cartridge 65 threaded into an upper end of the cap and an internal bore which mounts a poppet valve member 66 urged against a seat by a poppet spring 67. This poppet valve member controls communication between a tank line 68, defined by a passage in the cap and a connecting hose, and a line 69, defined by a passage in the actuator cap and a connecting hose. A selector valve 70 (FIG. 4) controls the tank and pump pressure connections to a line 71 having a first branch line 72 connected to one or more boom cylinders and a second branch line 73 connected to the line 69 and a corresponding line 69' of the right-hand stabilizer actuator 28.

Each of the hydraulic stabilizer actuators is mounted on an associated mounting pin 74 supported by the chassis member 16 and extending through a transverse slot 75 formed in the actuator cap 42. Guides, not shown, coact with the cylinder barrels 35 and 35' to prevent pivotal movement of the actuators on the mounting pins. The transverse slot 75 is elongate in the direction of the axis of linear movement of the piston rod 29 and is elliptical with rounded ends and permits bodily axial shift of the actuator cylinder 34 relative to the mounting pin 74. A plunger 76 is movably mounted within a spring retainer 77 and is free for following contact with the mounting pin 75. A plunger spring 78 has one end engaging the upper end of the plunger 76 and the other end engaging an end of the poppet valve member 66 of the isolation valve 61. The lengthwise positioning of the plunger 76 in the spring retainer 77 controls the degree of compression of the plunger spring 78 and, thus, the force applied against the bottom of the poppet valve member 66. The spring retainer 77 has openings 79 to connect the interior thereof with the tank line 68.

The forces exerted by the poppet spring 67 and the plunger spring 78 are carefully selected to assure that the plunger spring 78 always exerts enough force to either open or maintain open the poppet valve member 66 except when pressure is delivered from the selector valve 70 through the line 69. At such time, there is sufficient force to close the poppet valve member 66 against the action of the plunger spring 78. For illustrative purposes, only, and not limiting the invention, the poppet spring 67 can exert a force of 2.5 pounds when the poppet valve member is closed and a force of 3.9 pounds when the poppet valve member is open. The plunger spring can exert a force of 4 pounds when the plunger 76 is in the position shown in FIGS. 3 and 4 with an increase in force up to 13 pounds when the plunger 76 is moved upwardly from the position shown in FIG. 3.

With the mounting pin 74 having a diameter less than the length of the elongate elliptical slot 75, the upper end of the elongate slot 75 will rest on the upper surface of the mounting pin when the actuator is merely suspended thereon without the ground-engaging foot 31 in contact with the ground. When the piston rod 29 is forced downwardly by operation of the hydraulic circuit and the foot 31 contacts the ground, the actuator will no longer hang on the mounting pin 74 and the elongate elliptical slot 75 will move upwardly relative to the mounting pin 74. This moves the actuator cap 42 upwardly and causes extension of the plunger 78 into the elliptical slot 75 to reduce to a minimum the force exerted by the plunger spring 78.

Referring to the hydraulic circuit as shown in FIG. 4, the selector valve 70 communicates with a hydraulic pump 80 through a line 81 and has a connection to tank through a line 82. The selector valve 70, in the position shown, connects the boom cylinder branch line 72 and line 71 to tank line 82 and connects pressure line 81 to lines 83 and 83' extending to the left-hand control valve 50 and right-hand control valve 50', respectively.

In FIG. 4, the components are shown positioned for over-the-road travel wherein the stabilizer feet 31 and 32 are off the ground because of retraction of the piston rods 29 and 30. Pressure fluid is trapped in the cylinders beneath the pistons 36 and 36' because of the position-holding check valve poppet valve members 56 and 56' being closed on their respective seats. The control valves 50 and 50' are in their centered positions wherein lines 83 and 83' extended from the selector 70 valve communicate with tank. The poppet valve members 66 and 66' of the isolation valves are open because of the mounting pins 74 and 74' urging the respective plungers 76 and 76' upwardly to have the plunger springs 78 and 78' exert maximum force to open the poppet valve members 66 and 66'. With this condition, lines 68 and 69 and 68' and 69, which communicate with opposite sides of the isolation valve poppet valve members, are all communicating with tank.

When the vehicle has arrived at the desired location for operation of the vehicle-mounted boom, the pump 80 is brought into operation, with the components shown in FIG. 4 remaining in the same position and with the lines 83 and 83' leading to the left and right-hand control valves 50 and 50' being supplied with fluid under pressure which flows to tank.

The next step is to lower the ground-engaging feet of the stabilizer actuators, with this operation being achieved by positioning of the components of the hydraulic circuit as shown in FIG. 5. The left-hand control valve 50 is shifted to the right and the right-hand control valve 50' is shifted to the left whereby lines 83 and 83' extending from the selector valve 70 communicate with lines 52 and 52' extending to the transverse bores 44 and 44' for the position-holding check valves. Fluid pressure in the transverse bores opens the poppet valve members 53 and 53' to direct pressure fluid through lines 55 and 55' to the upper ends of the cylinders and exert downward force on the pistons 36 and 36'. At the same time, the pilot check pistons 60 and 60' are shifted to the left and right, respectively, to open the poppet valve members 56 and 56' whereby the lines 58 and 58' communicating with the lower end of the cylinders are connected to tank through lines 51 and 51' and the control valves 50 and 50'. The flow of fluid from the pump to the upper ends of the cylinders is shown in solid line arrows, while flow from the cylinders to tank is shown by broken line arrows.

When the ground-engaging feet 31 and 32 associated with the piston rods 29 and 30 engage the ground, the cylinders are caused to move upwardly relative to the mounting pins 74 and 74' which carries the actuator caps upwardly and causes the plungers 76 and 76' to move downwardly to the positions shown in FIGS. 3 and 5. This reduces the force of the plunger spring 78 and 78' acting on the poppet valve members 66 and 66' of the isolation valves. However, these valves remain open as shown in FIG. 5 because of the force of the plunger springs 78 and 78' still being greater than the force of the poppet valve springs 67 and 67'. The lines 69 and 69' extending from the isolation valve poppet valve members are at tank pressure by connection through line 73 to the selector valve 70 and tank line 82.

With the stabilizer actuators extended to place the ground-engaging feet 31 and 32 in firm contact with the ground, the left and right-hand control valves 50 and 50' are brought back to their centered position to close the lines 51 and 52 and 51' and 52' extending to the position-holding check valves. The position-holding check valve poppet valve members 53 and 53' close to hold the actuator piston rods extended.

To operate the boom cylinders, the selector valve 70 is shifted to the right from the position shown in FIG. 5 whereby line 81 extending from the pump 80 communicates with the line 71 and branch lines 72 and 73, to deliver pressure fluid to the boom cylinders and to the lines 69 and 69' extending to the upper side of the valve seats for the isolation valve poppet valve members 66 and 66'. There is sufficient pressure to cause closure of the latter poppet valve members to avoid bleeding of pressure fluid through spring retainer openings 79 to tank lines 68' and 69' extending from the isolation valves.

From the foregoing description, it will be evident that pressure can be supplied to the branch line 72 for the boom cylinders only if the isolation valves detect firm contact of the ground-engaging feet 31 and 32 with the ground and resulting upward shift of the actuator caps. If there is not firm contact of a foot with the ground, the actuator cap will not move upwardly and, thus, the actuator slot 75 will remain resting on top of the mounting pin 74 or 74' to have the respective plunger 76 or 76' in its uppermost position. The maximum compression and resulting maximum force of a plunger spring holds a poppet valve member of an isolation valve open against fluid pressure and, thus, line 71 will be connected to tank through either of tank line 68 or 68' leading from the isolation valves and the boom cylinders cannot be operated.

The operation of the hydraulic circuit when the vehicle tilts to cause a ground-engaging foot of a stabilizer to leave the ground is illustrated in FIG. 6. The operation illustrated is for when the vehicle tilts to the right and the ground-engaging foot 31 for the left-hand hydraulic stabilizer actuator 26 leaves the ground. The components are shown in the positions taken after the ground-engaging feet 31 and 32 are firmly engaged with the ground and the selector valve 70 has directed fluid pressure to the boom cylinders through the line 72 except that the mounting pin 74 is at the upper end of the elliptical slot 75 in the actuator cap 42. The left stabilizer foot 31 has left the ground because of tilt of the vehicle and the cylinder 34 has moved downwardly. The plunger 76 has been moved upwardly for compression of the spring 78 to increase the force thereof. This force would normally be sufficient to open the isolation valve poppet valve member 66. However, the poppet valve member remains on its seat due to the closing force exerted by spring 67 as well as pressure in line 69 which is applied to the back side of the poppet valve member. As a result, there is no communication between line 69 and tank line 68. There is a level of "back" pressure due to the length of fluid conduit and number of restrictions of various kinds between the pump and the return connection to tank. This "back" pressure holds the poppet valve member 66 on its seat whether or not the plunger spring 78 is compressed. As a result, there can be continued operation of the boom circuit even if the ground-engaging foot is lifted off the ground by deflection of the vehicle suspension system during operation of the booms.

From the foregoing description, the operation of the vehicle stabilizer apparatus and the stabilizer actuator component thereof is believed readily understood. For over-the-road travel of the vehicle, the ground-engaging feet are in an upper position and held in that position by fluid trapped in the cylinders 34 and 34'. When the vehicle is at the operating site, the pump 80 is brought into operation and, thereafter, the left and right-hand control valves 50 and 50' are shifted to the positions shown in FIG. 5 to extend the piston rods and lower the ground-engaging feet 31 and 32 into firm contact with the ground or other supporting surface. After completion of this operation, the left and right-hand control valves are returned to their neutral center position and the control valve 70 is operated to operate the boom cylinders. If either of the ground-engaging feet fails to make firm contact with the ground, the control valve 70 will not be effective to cause operation of the boom cylinders because of one or the other of the poppet valve members 66 and 66' remaining open.

The vehicle is prepared for further travel by returning the booms to a storage position and, thereafter, the left and right-hand control valves are shifted to a position opposite from that shown in FIG. 5 wherein lines 51 and 51' are connected with the pump to connect the bottom of the cylinders with the pump through the open poppet valve members 56 and 56'. The pilot check pistons 60 and 60' have shifted to open the poppet valve members 53 and 53' whereby the upper ends of the cylinders are connected to tank. After retraction of the ground-engaging feet 31 and 32, the operation of the pump can be discontinued to complete a cycle of operation.

We claim:

1. A hydraulic stabilizer actuator for pressing an element against a support surface and usable in a hydraulic circuit having a device only operable after the element engages the support surface, comprising: a cylinder having a piston and a piston rod extended therefrom for mounting said element; means for mounting said cylinder for movement along the axis of the piston rod between two positions whereby said cylinder has a first lower position when said element is out of engagement with the support surface and a second upper position when said element presses against the support surface; and an isolation valve carried by the cylinder and connectable into said hydraulic circuit and operable to prevent operation of said device when said cylinder is in said first lower position.

2. A hydraulic stabilizer actuator as defined in claim 1 wherein said means for movably mounting said cylinder includes a transverse through slot in said cylinder with said slot being elongate along the axis of the piston rod movement, said slot being adapted for receiving a mounting pin of a size less than the length of the slot to enable cylinder movement between said first and second positions.

3. A hydraulic stabilizer actuator as defined in claim 2 wherein said cylinder movably mounts a plunger and a plunger spring with said plunger spring positioned between the plunger and the isolation valve, and said plunger communicating with said slot to contact said mounting pin whereby the position of the plunger and the force of the compression spring acting on the isolation valve varies dependent on the position of the cylinder.

4. A hydraulic stabilizer actuator as defined in claim 3 wherein said isolation valve has a poppet valve member urged against a valve seat by a poppet spring acting in opposition to said plunger spring.

5. A hydraulic actuator as defined in claim 4 wherein the plunger spring always exerts a greater force on the poppet valve member in an opening direction than the force of the poppet spring acting in a direction to close the poppet valve member.

6. A hydraulic stabilizer actuator mountable on a vehicle for pressing a ground-engaging foot against the ground and usable in a hydraulic circuit having a selector valve only operably effective after the ground-engaging foot engages the ground, comprising: a cylinder having a piston and a piston rod extended therefrom; a ground-engaging foot pivoted to an end of the piston rod; means mounting said cylinder for movement along the axis of movement of the piston rod between two positions including a first lower position when said ground-engaging foot is out of engagement with the ground and a second upper position when said ground-engaging foot is pressed against the ground; and an isolation valve carried by the cylinder and connectable into said hydraulic circuit to connect said selector valve to tank when said cylinder is in said first lower position.

7. A hydraulic stabilizer actuator as defined in claim 6 wherein said means for movably mounting said cylinder includes an elliptical mounting slot in a cap for said cylinder with said slot being elongate along the axis of the piston rod movement, and a mounting pin on said vehicle and positioned in said mounting slot and of a size less than the length of the slot to enable cylinder movement between said first and second positions.

8. A hydraulic stabilizer actuator as defined in claim 7 wherein said cylinder movably mounts a plunger and a plunger spring with said plunger spring positioned between the plunger and the isolation valve, and said plunger communicating with said mounting slot to contact said mounting pin in all positions of the cylinder whereby the position of the plunger and the force of the plunger spring acting on the isolation valve varies dependent on the position of the cylinder.

9. A hydraulic stabilizer actuator as defined in claim 8 wherein said isolation valve has a poppet valve member urged against a valve seat by a poppet spring acting in opposition to said plunger spring.

10. A hydraulic stabilizer actuator as defined in claim 9 wherein the plunger spring exerts a greater force on the poppet valve member in an opening direction in both positions of the cylinder than the force of the poppet spring acting in a direction to close the poppet valve member.

11. A vehicle stabilizer apparatus, comprising: a hydraulic circuit having a selector valve for control of boom cylinders and left and right-hand control valves; a pair of actuators associated one with each of said control valves, each actuator having a cylinder with an extensible piston rod having a round-engaging foot pivotally mounted to a lower end thereof; and means mounting the actuators to a vehicle to enable an actuator to have upper and lower positions dependent upon whether the ground-engaging foot engages the ground; each of said actuators having means to place said selector valve in communication with tank to prevent operation of the boom cylinders including an isolation valve in a line between the selector valve and tank, and means to forcibly hold the isolation valve open when the actuator is in said lower position due to lack of contact between a ground-engaging foot and the ground.

12. A vehicle stabilizer apparatus as defined in claim 11 wherein said means mounting the actuator to a vehicle comprises a vehicle-supported mounting pin for each actuator, and each actuator having an elliptical slot of a length sufficient to enable the mounting pin to have two different positions in the slot.

13. A vehicle stabilizer apparatus as defined in claim 12 wherein said means for forcibly holding the isolation valve open comprises a movable plunger carried by the actuator which is in following contact with the mounting pin, and a compressible plunger spring between the plunger and the isolation valve.

14. A vehicle stabilizer apparatus, comprising: a hydraulic circuit having a selector valve for control of boom cylinders and left and right-hand control valves; a pair of actuators associated one with each of said control valves, each actuator having a cylinder with an extensible piston rod having a ground-engaging foot at a lower end thereof; a vehicle-supported mounting pin for each of said actuators; and each of the actuators having an elliptical mounting slot receiving the associated mounting pin and being of a size to enable an actuator to have upper and lower positions relative to the mounting pin dependent upon whether the ground-engaging foot engages the ground, means to place said selector valve in communication with tank to prevent operation of the boom cylinders including an isolation valve in a line between the selector valve and tank, and a plunger and plunger spring interposed between the mounting pin and isolation valve to forcibly hold the isolation valve open when the actuator is in said lower position due to lack of contact between a ground-engaging foot and the ground.

* * * * *